Figure 1:
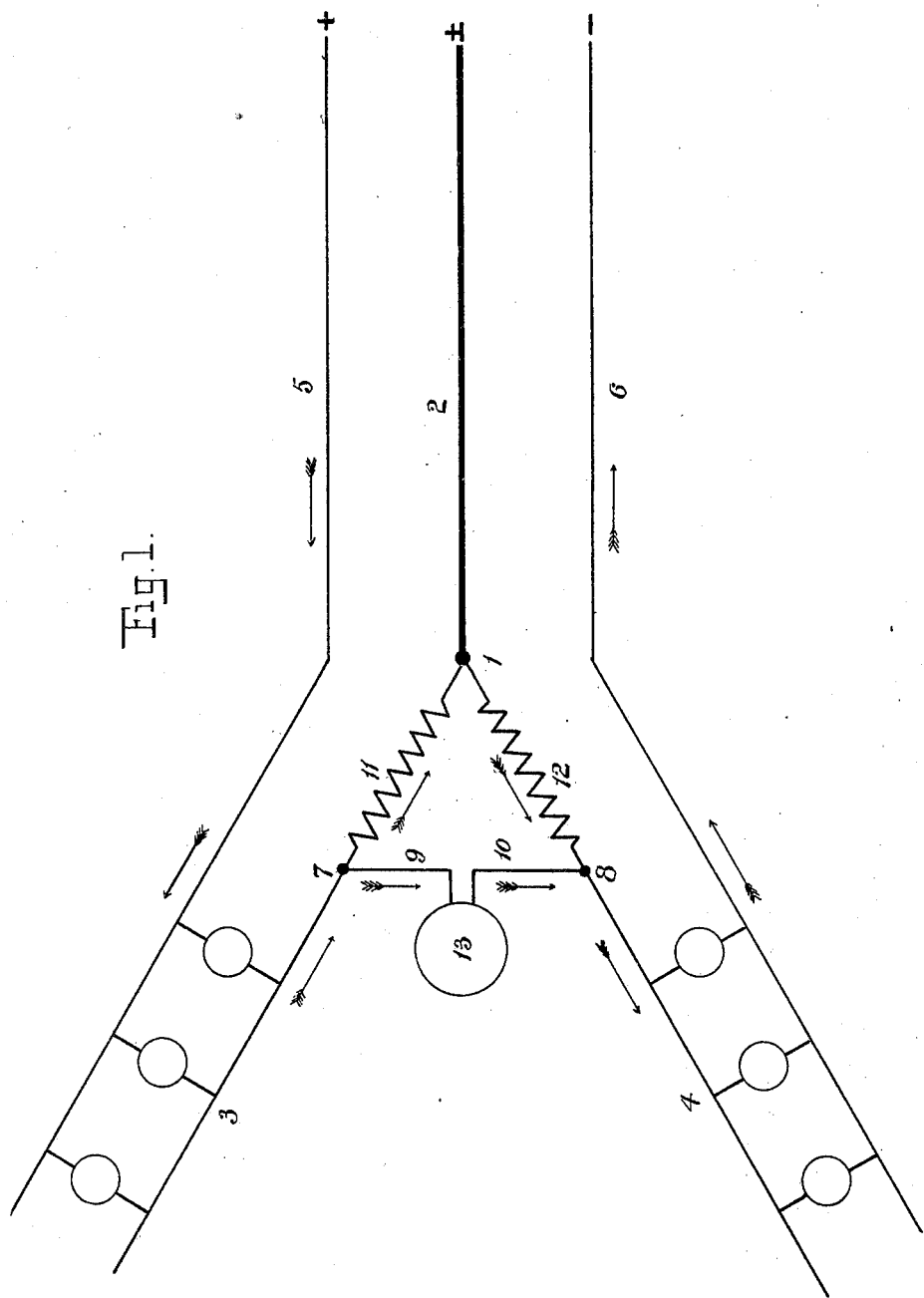

No. 675,001. Patented May 28, 1901.
J. R. DICK.
APPARATUS FOR CONNECTING ELECTRIC METERS IN THREE-WIRE CIRCUITS.
(Application filed Mar. 9, 1900.)
(No Model.) 2 Sheets—Sheet 1.

WITNESSES.
INVENTOR.
John Reid Dick

No. 675,001. Patented May 28, 1901.
J. R. DICK.
APPARATUS FOR CONNECTING ELECTRIC METERS IN THREE-WIRE CIRCUITS.
(Application filed Mar. 9, 1900.)
(No Model.) 2 Sheets—Sheet 2.

WITNESSES.
Emmeline Ray
Auguste Sinclair

INVENTOR.
John Reid Dick

UNITED STATES PATENT OFFICE.

JOHN R. DICK, OF BRIGHTON, ENGLAND, ASSIGNOR TO MUTUAL ELECTRIC TRUST, LIMITED, OF SAME PLACE.

APPARATUS FOR CONNECTING ELECTRIC METERS IN THREE-WIRE CIRCUITS.

SPECIFICATION forming part of Letters Patent No. 675,001, dated May 28, 1901.

Application filed March 9, 1900. Serial No. 8,002. (No model.)

*To all whom it may concern:*

Be it known that I, JOHN REID DICK, a subject of the Queen of Great Britain, and a resident of Brighton, in the county of Sussex, England, have invented Apparatus for Connecting Electric Meters in Three-Wire Circuits, of which the following is a specification.

My invention relates to a method of and apparatus for connecting electric meters in what are known as "three-wire" circuits by means of which certain advantages are obtained. By "three-wire" circuits I mean circuits arranged under what is known in Great Britain as the "Hopkinson three-wire system" and in America as the "Edison three-wire system."

In order that the nature of my invention may be more readily understood, I have appended hereto a drawing, in which I diagrammatically illustrate my invention as applied in the case of a three-wire circuit containing what is known as a "Wright indicator" or, as it is frequently termed, a "demand indicator." I desire it to be understood, however, that my invention is not limited to use in connection with Wright indicators. Other electric measuring instruments or electric meters may be employed in the same way.

In the following description I shall assume that the measuring instrument or meter employed in my invention is one of the forms of Wright indicator—such, for example, as that illustrated in United States Patent No. 583,160, dated May 25, 1897.

In order to measure the maximum demand of an electrical installation where the three branches of a three-wire system are brought into the premises, it has previously been necessary to connect up a recording instrument in each of the two outside wires. The two readings of these instruments were added together to arrive at the maximum demands of the whole installation. This method presents some disadvantages—first, because the maximum demand on the positive and on the negative sides of the three-wire circuit may not be coincident. In such a case the sum of the two readings would be greater than the actual amount of the demand on the plant at the central station. In other words, if the maximum current in the positive wire be called "A" and the maximum current in the negative wire be called "B" the quantity we wish to measure is when "A" plus "B" is a maximum and not the sum of "A" when it is a maximum and "B" when it is a maximum separately. Further, the previous method necessitated the expense of two instruments, one of which was placed in the positive and the other in the negative wire.

By means of my invention I am able to obtain accurate readings without the employment of two separate instruments.

Figure 2:
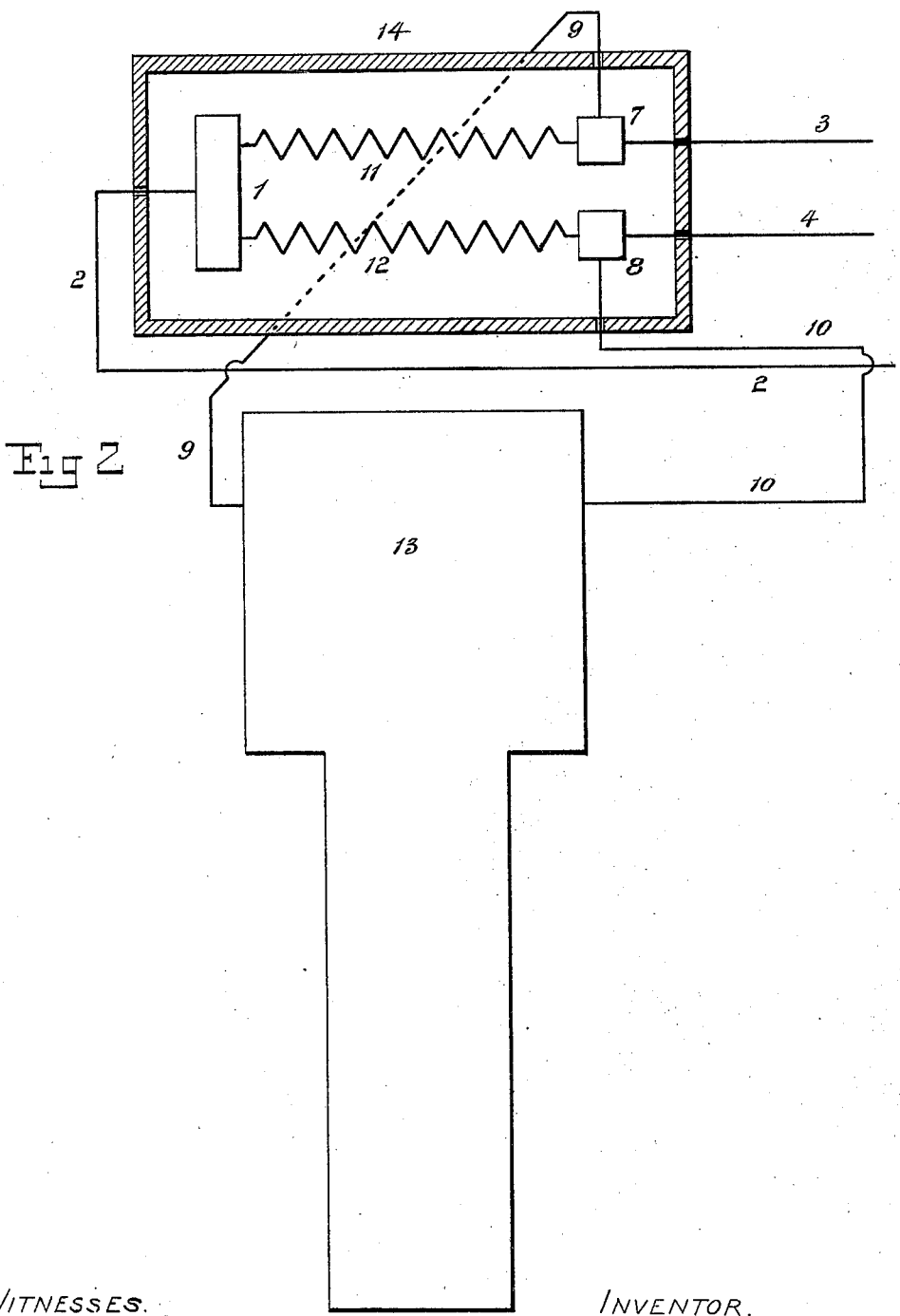

Figure 1 illustrates diagrammatically the application of my invention. Fig. 2 illustrates the same in connection with a resistance-box and a Wright's demand-indicator box.

Referring now to the accompanying drawings, it will be seen that at the point 1, which may be assumed to be within a house, I split the neutral main 2 into two leads 3 and 4, one of which—say 3—I associate with the positive main 5, and the other of which—say 4—I associate with the negative main 6. Between the point 1, where the neutral main divides, and the points 7 and 8 I insert two equal resistances 11 and 12, and I connect the Wright indicator 13 across the two branches by means of the wires 9 10, springing from the points 7 8, as shown. Connected up in this way the indicator 13 will give a true reading, as the following algebraic considerations will make clear. The arrows in the drawings show the direction of current for a particular case.

$A$ = current on positive side.

$B$ = current on negative side.

$i$ = current in demand indicator or meter.

$r$ = resistance of demand indicator or meter circuit.

R and R = equal resistances in two branches.

$I'$ = current in one branch.

$I^2$ = current in other branch.

In the circuits, $$I' R + I^2 R = i r;$$

but $$I' = A - i$$

and $$I^2 = B - i,$$

$$R(A - i + B - i) = i r,$$

$$R(A + B) - 2i R = i r,$$

$$(A + B) = \frac{i(r + 2R)}{R}.$$

Now this holds good for maximum values, and (A+B) maximum is what we want to measure. It is thus seen that the readings of the indicator are proportional to "A" plus "B," and as the instrument records the maximum current which is passed through it it is obvious that it will record the maximum value of the quantity of current "A" plus "B." It will be seen that the crucial point of the invention is to have the two resistances 11 and 12, which are interpolated in the branches of the neutral wire 2, practically equal. The action of these resistances is to cause a determinate portion of each of the two currents to pass through the instrument, so that the indication of the instrument is always proportional to the sum of these two currents. It is quite obvious that the two resistances referred to should be comparatively small, so as not to cause an undue drop in the voltage of the lamps or other consuming apparatus.

In practice I find it convenient to have the two resistances in a separate box 14, arranged as is shown diagrammatically in Fig. 2. In this figure the same numerals of reference are employed as in Fig. 1, and the parts correspond therewith. It is obvious also that this method of measurement in conjunction with an ordinary meter is equally applicable to measuring the energy consumed by such a three-wire installation as well as to measure the maximum demand and that the circle 13 may represent many forms of indicating or measuring instrument.

Having thus described my invention, what I claim, and desire to secure by Letters Patent, is—

1. A three-wire circuit comprising a neutral conductor split into branches, resistances in each branch equal to each other, and a measuring instrument connected thereto, substantially as described.

2. A three-wire circuit comprising a neutral conductor split into two branches, two substantially equal resistances in the two branches respectively, and a measuring instrument in a bridge across the two branches, substantially as described.

3. A three-wire circuit comprising a neutral conductor split into two branches, and an equal resistance in each branch, all for use with a measuring instrument to be applied thereto, substantially as described.

In witness whereof I have hereunto set my hand in presence of two witnesses.

JOHN R. DICK.

Witnesses:
HERBERT C. HUGHES,
AUGUSTE SINCLAIR.